US007783029B2

(12) United States Patent
Whitecotten et al.

(10) Patent No.: US 7,783,029 B2
(45) Date of Patent: Aug. 24, 2010

(54) SYSTEM AND METHOD OF MANAGING CALLS TO A CUSTOMER SERVICE CALL CENTER

(75) Inventors: Daniel Scott Whitecotten, Arlington Heights, IL (US); Karen Lee Mrachek, Oconomowoc, WI (US); Joshua David Goodell, Seal Beach, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1068 days.

(21) Appl. No.: 11/200,870

(22) Filed: Aug. 10, 2005

(65) Prior Publication Data

US 2007/0041551 A1 Feb. 22, 2007

(51) Int. Cl.
*H04M 3/00* (2006.01)
(52) U.S. Cl. .................. 379/265.06; 379/212.01; 379/265.01; 379/265.03; 379/265.05
(58) Field of Classification Search ............ 379/212.01, 379/265.01, 265.03, 265.06, 265.05, 266.02
See application file for complete search history.

(56) References Cited

U.S. PATENT DOCUMENTS

| 7,050,566 B2* | 5/2006 | Becerra et al. ......... 379/265.12 |
| 7,599,842 B2* | 10/2009 | Tivey et al. .................... 705/1 |
| 2004/0202309 A1* | 10/2004 | Baggenstoss et al. .. 379/265.06 |
| 2006/0002540 A1* | 1/2006 | Kreiner et al. ......... 379/265.02 |

* cited by examiner

*Primary Examiner*—Melur Ramakrishnaiah
*Assistant Examiner*—Yosef K Laekemariam
(74) *Attorney, Agent, or Firm*—Toler Law Group

(57) ABSTRACT

A method of managing calls at a call service center is disclosed and includes monitoring a plurality of calls that are received at the call service center. Further, the method includes monitoring service transactions that are handled by a plurality of customer service agents. The method also includes determining a sales success metric of each of the plurality of customer service agents for each of a plurality of services offerings and ranking the customer service agents in terms of the service success metric for each of the plurality of service offerings. Additionally, the method includes recording the customer service agent rankings for each of the service offerings.

22 Claims, 4 Drawing Sheets

SYSTEM AND METHOD OF MANAGING CALLS TO A CUSTOMER SERVICE CALL CENTER

FIELD OF THE DISCLOSURE

The present disclosure relates to call centers.

BACKGROUND

Call centers typically handle customer service calls in the order that the calls are received. As such, callers wait in queue for a next available agent who may or may not possess the skills to handle the call, i.e., the skills to respond to the reason for the call. As a result, customer issues may not be met without having to transfer the call to another customer service agent or without requiring the customer to call the call center multiple times.

Accordingly, there is a need for an improved system and method of managing calls at a call center.

BRIEF DESCRIPTION OF THE DRAWINGS

The present disclosure is pointed out with particularity in the appended claims. However, other features are described in the following detailed description in conjunction with the accompanying drawings in which:

DETAILED DESCRIPTION OF THE DRAWINGS

A method of managing calls at a call service center is disclosed and includes monitoring a plurality of calls that are received at the call service center. Further, the method includes monitoring service transactions that are handled by a plurality of customer service agents. The method also includes determining a sales success metric of each of the plurality of customer service agents for each of a plurality of services offerings and ranking the customer service agents in terms of the service success metric for each of the plurality of service offerings. Additionally, the method includes recording the customer service agent rankings for each of the service offerings.

In a particular embodiment, the method includes receiving a telephone call, determining whether the call is related to sales of a service, determining a service of interest when the call is determined to be related to sales of a service, and determining whether a top ranked customer service agent based on the sales success metric for the service of interest is available to take the call.

Also, in a particular embodiment, the method includes transferring the telephone call to the top ranked customer service agent. Alternatively, the method includes transferring the telephone call to a next highest ranked customer service agent for the service of interest.

In another embodiment, a method of managing telephone calls at a customer call center is provided and includes receiving a telephone call, determining whether the telephone call is a repeat telephone call related to a prior call, determining a reason for the telephone call, determining whether the reason for the telephone call is a reason that is similar to or the same as a reason for the prior call, and routing the telephone call to a call agent with specific skills to support calls with the reason.

In yet another embodiment, a system for managing calls at a customer call center is provided and includes a call server, a processor within the call server, and a memory that is accessible to the processor. A computer program is embedded within the memory and includes instructions to determine whether the telephone call is a repeat telephone call related to a prior call, instructions to determine a reason for the telephone call, instructions to determine whether the reason for the telephone call is a reason that is similar to or the same as a reason for the prior call, and instructions to route the telephone call to a call agent with specific skills to support calls with the reason.

In still another embodiment, a call agent server is disclosed and includes a processor and a memory that is accessible to the processor. A computer program is embedded within the memory and includes instructions to monitor a plurality of calls received at a plurality of customer service agents and instructions to rank the customer server agents in terms of sales success for each service offered.

Figure 1:
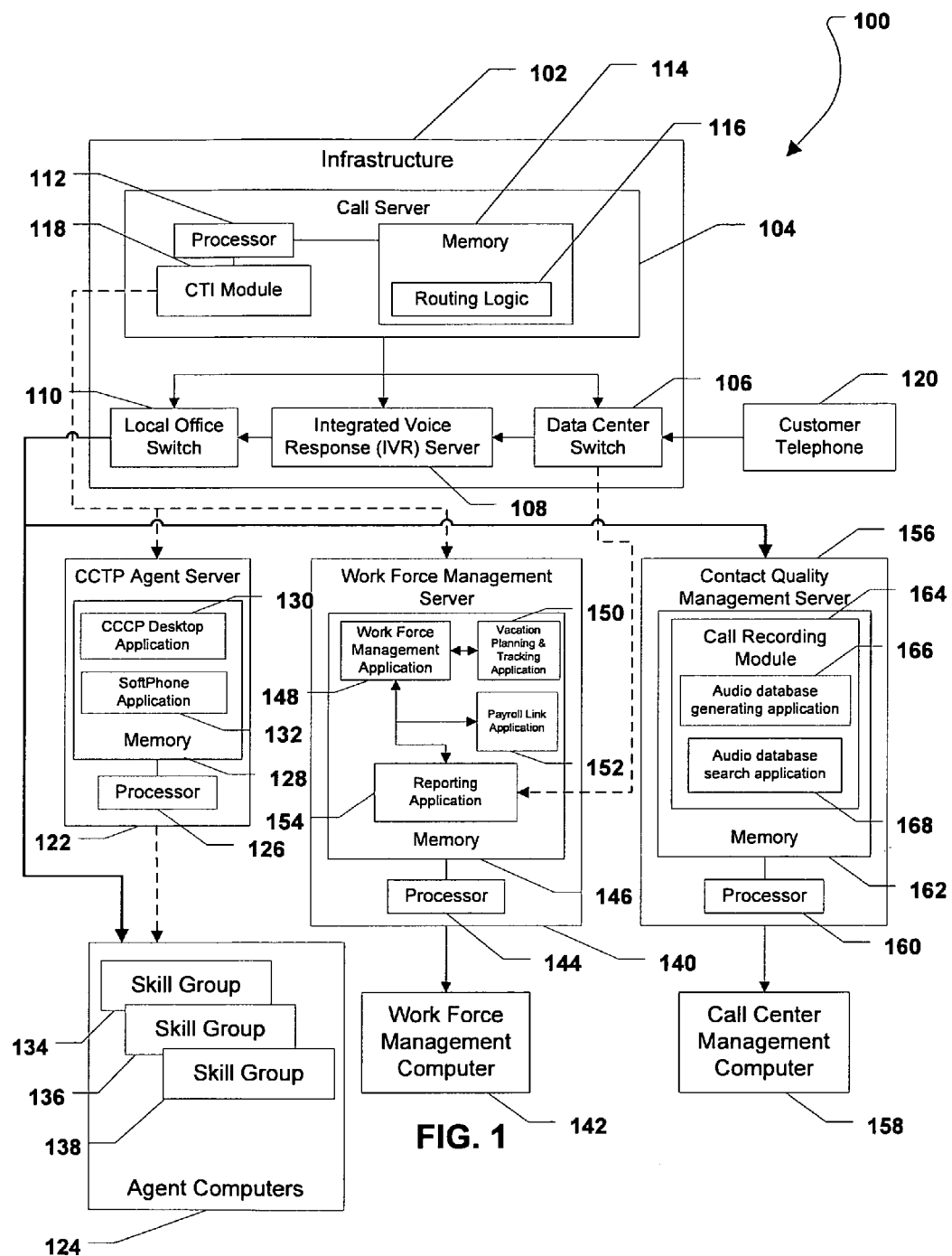
FIG. 1 is a block diagram that is representative of a call management system.

Referring to FIG. 1, a call center system is shown and is generally designated 100. As shown, the system 100 includes an infrastructure system 102 that includes a call server 104 that is coupled to a data center switch 106, an integrated voice response (IVR) server 108, and a local office switch 110. As illustrated in FIG. 1, the call server 104 includes a processor 112 and a memory 114 that is accessible to the processor 112. Additionally, routing logic 116 is embedded within the memory 114 and can be used to route calls as described below. Further, a computer telephone integration (CTI) module 118 can be coupled to the processor 112. In a particular embodiment, the CTI module 118 can also be embedded within the memory 114.

As depicted in FIG. 1, a customer telephone 120 can place a call that is received at the data center switch 106 via a telephone network, e.g., a cellular telephone network, a wireless telephone network, or a public switched telephone network (PSTN). FIG. I further indicates that the CTI module 118 within the call server 104 can be coupled to a Call Center Transformation Program (CCTP) agent server 122 that is coupled to a plurality of agent computers 124. As shown in FIG. 1, the CCTP agent server 122 includes a processor 126 and a memory 128 that is accessible to the processor 126. In a particular embodiment, a CCTP desktop application 130 and a softphone application 132 can be embedded within the memory 128 of the CCTP agent server 122.

As shown, in an exemplary, non-limiting embodiment, the plurality of agent computers 124 can include a first skill group 134, a second skill group 136, and a third skill group 138. In a particular embodiment, call support agents in each skill group 134, 136, 138 may be established based on the skills that the call agents within the skill group 134, 136, 138 possess with respect to support of particular types of customer service calls. Further, the skill groups 134, 136, 138 may be established based on the skill levels of the call agents within the skill group 134, 136, 138. Further, the skill groups 134, 136, 138 may be established based on the sales success of the call agents within each of the skill groups 134, 136, 138. In an alternative embodiment, the agent computers 124 can be divided into any number of skill groups. In a particular embodiment, the call agents can be monitored in order to determine a percentage of total transactions handled by each call agent that results in a sale. Then, each call agent may be ranked based on the percentage of total transactions handled by the call agent that resulted in a sale.

FIG. 1 further shows that the CTI module 118 within the call server 104 can be coupled to a work force management server 140, which, in turn, can be coupled to a work force management computer 142. As illustrated in FIG. 1, the work force management server 140 includes a processor 144 and a memory 146 coupled thereto. Further, in an exemplary, non-limiting embodiment, a work force management application 148 can be embedded within the memory 146.

Additionally, a vacation planning and tracking application 150 and a payroll link application 152 can be embedded within the memory 146 and can be coupled to the work force management application 148. Moreover, a reporting application 154 can be embedded within the memory 146 of the work force management server 140 and can be coupled to the work force management application 148. In a particular embodiment, the work force management computer 142 can be used by a manager to access the work force management server 140 in order to manage a plurality of customer call support agents.

As further illustrated in FIG. 1, a local office switch 110 can be coupled to a contact quality management server 156. Further, the contact quality management server 156 can be coupled to a call center management computer 158. As illustrated in FIG. 1, the contact quality management server 156 can include a processor 160 and a memory 162 coupled to the processor 160. Further, a call recording module 164 can be embedded within the memory 162. In a particular embodiment, the call recording module 164 can include an audio database generating application 166 and an audio database search application 168. In a particular embodiment, the call recording module 164 can monitor and record customer service calls. Moreover, a call center manager can use the call center management computer 158 to access the contact quality management server 156 to manage the quality of customer service provided by the plurality of customer service agents.

Figure 2:
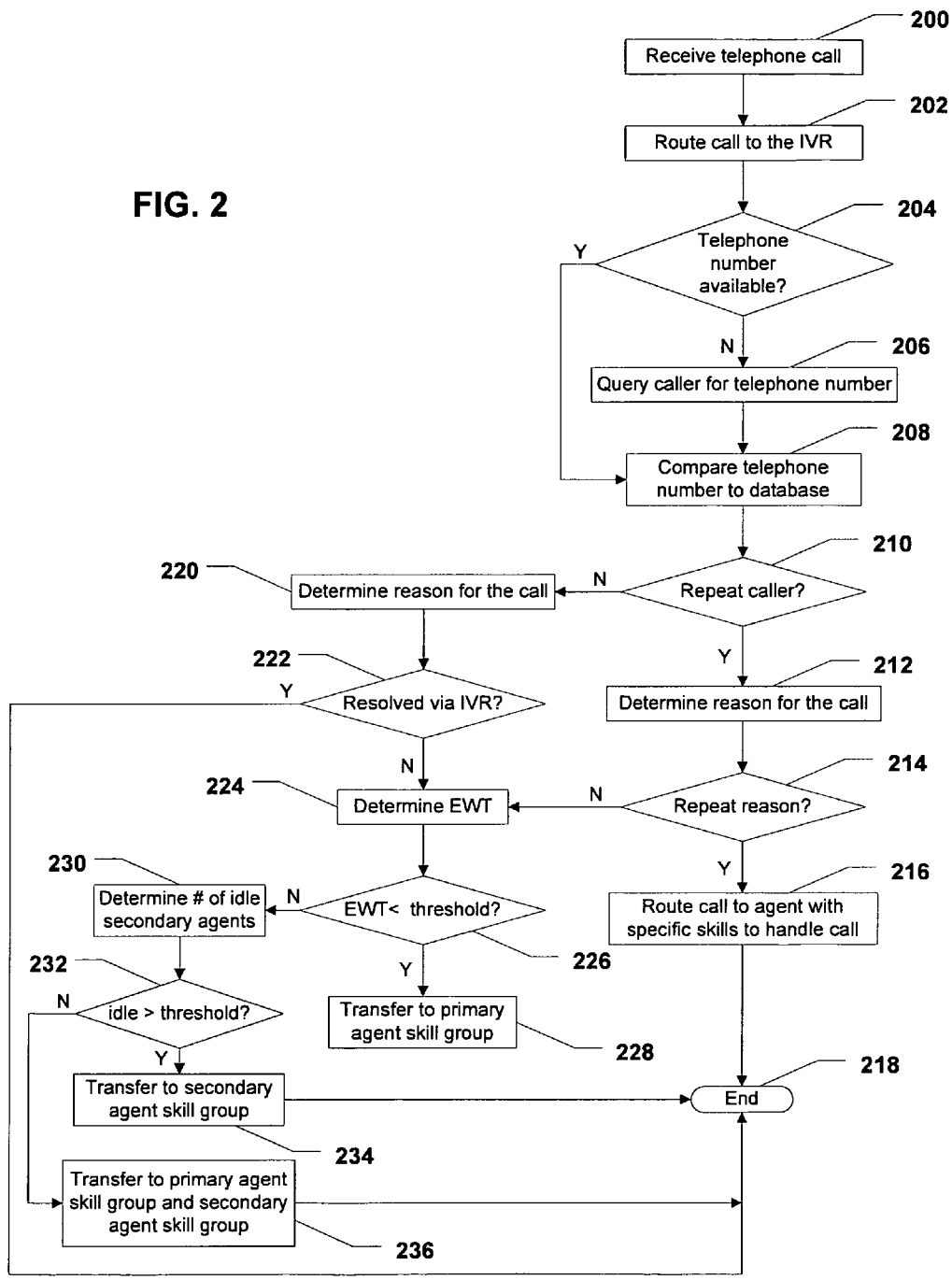
FIG. 2 is a flow chart to illustrate a method of managing calls at a call center.

Referring to FIG. 2, a method of managing calls at a customer service center is shown and commences at block 200. At block 200, a telephone call from a customer is received. At block 204, the call is routed to an IVR. Moving to decision step 204, it is determined whether the telephone number for the telephoned call is available. If not, the caller is queried for the telephone number, at block 206. The method then proceeds to block 208. At decision step 204, if the telephone number is available, the method proceeds directly to block 208.

At block 208, the telephone number is compared to a database. Thereafter, it is determined whether the call is a repeat call based on the telephone number of the caller. If so, the method proceeds to block 212 and a reason for the call is determined. In a particular embodiment, the user can be prompted to speak the reason for the call. Moving to decision step 214, it is determined whether the reason for the call is a repeat reason, i.e., whether the caller has called for the same reason or a similar reason within a recent time frame. In a particular embodiment, the time frame can be a week, two weeks, three weeks, a month, etc. Further, each time a particular caller calls, the reason for the call may be saved in a database or memory.

If the reason for the call is a repeat reason, the method proceeds to block 216 and the call is routed to an agent with the specific skills to handle calls based on the identified reason for the call. As such, the reason for the call is more likely to be resolved by the agent with specific skills and the user's experience is most likely to be satisfactory. The method then ends at state 218.

Returning to decision step 210, if the caller is not a repeat caller, the method proceeds to block 220 and the reason for the call is determined. The method then returns to decision step 222 and it is determined whether the reason for the call is resolved via the IVR. If so, the method ends at state 218.

On the other hand, if the reason for the call not resolved via the IVR, the method proceeds to block 224 and an estimated wait time (EWT) before a call agent is available is determined. Proceeding to decision step 226 it is determined whether the EWT is less than a threshold. In a particular embodiment, the threshold can be ten seconds, thirty seconds, sixty seconds, or any other predetermined time. If the EWT is less than the threshold, the method proceeds to block 228 and the call is transferred to a primary agent skill group to be answered by a next available primary agent, e.g., an agent with a skill set that includes the skills for handling a variety of and preferably all of the predicted call issues and reasons. The method then ends at state 218.

Conversely, at decision step 226, if the EWT is not less than the threshold, the method continues to block 230 and a number of idle secondary agents is determined. Thereafter, at decision step 232, it is determined whether the number of idle secondary agents is greater than a threshold. When the number of idle secondary agents is greater than a threshold, the method moves to block 234 and the call is transferred to a secondary agent skill group to be answered by the next available secondary agent. The method then ends at state 218.

At decision step 232, if the number of idle secondary agents is not greater than the threshold, the method proceeds to block 236 and the call is transferred to a primary agent skill group and a secondary agent skill group to be answered by the next available primary agent or secondary agent. Then, the method ends at state 218. Returning to decision step 214, if the call is a repeat call but the reason is not a repeat reason, the method proceeds to block 224 and continues as described above.

In a particular embodiment, the predicted call issues may be predicted based on the types of goods and services offered for sale and the problems that may be associated with the goods and services. For example, if the service is a digital subscriber line (DSL) service, a predicted call issue may include an inability to connect to the Internet. Further, the predicted call issues may be determined by an administrator or manager based on actual problems that have been reported by customers in the past.

In an exemplary, non-limiting embodiment, further agent distinctions can be provided based on the number of required skills that each customer service agent possesses. For example, in addition to primary agents and secondary agents, calls can be routed to tertiary agents and quaternary agents. In a particular embodiment, tertiary agents may possess fewer skills than the primary agents and quaternary agents may possess fewer skills than the tertiary agents. Calls can be routed to the different agents in different agent groups based on the EWT and the availability of the agents.

Figure 3:
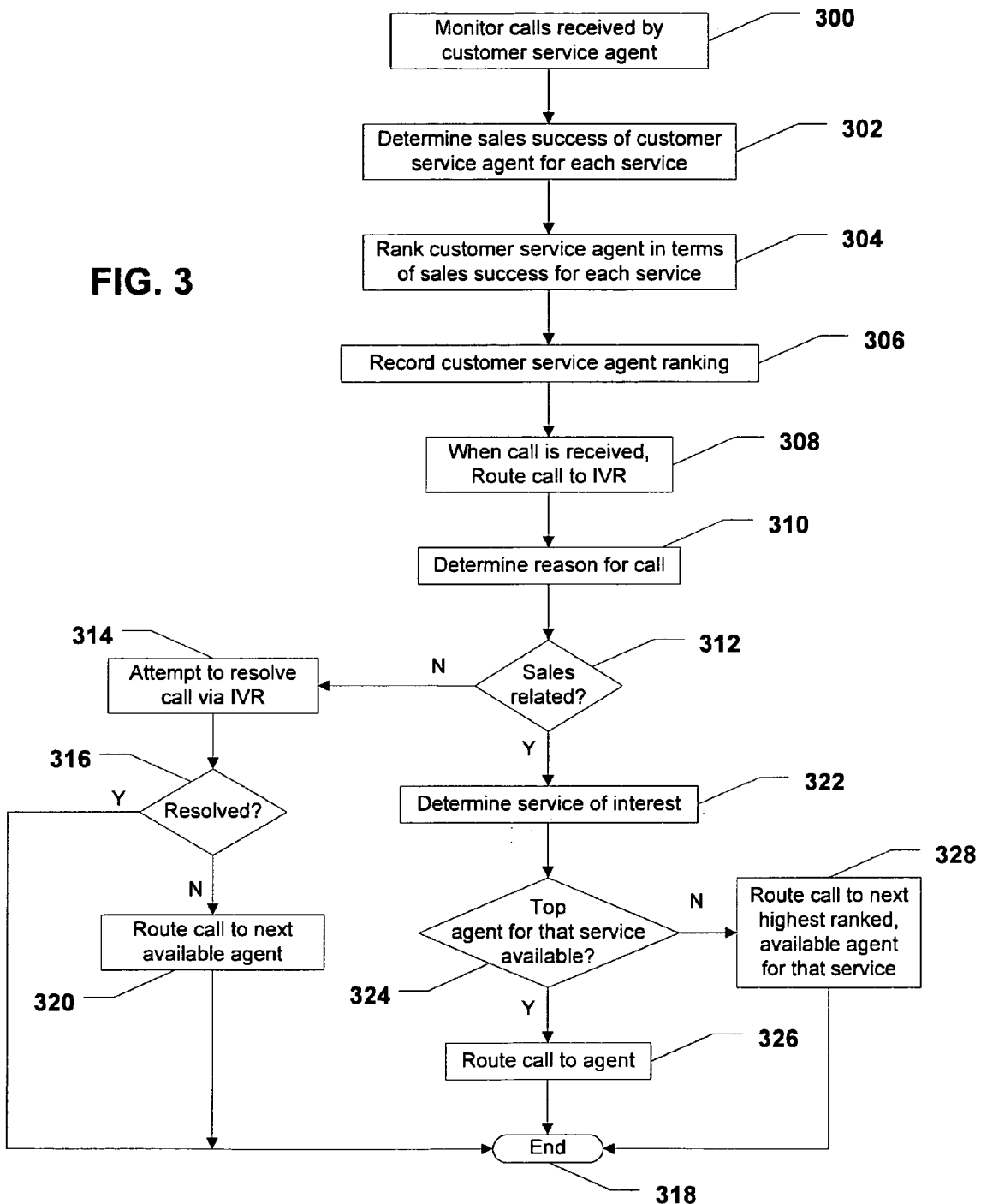
FIG. 3 is a flow chart to illustrate an alternative method of managing calls at a call center.
Figure 4:
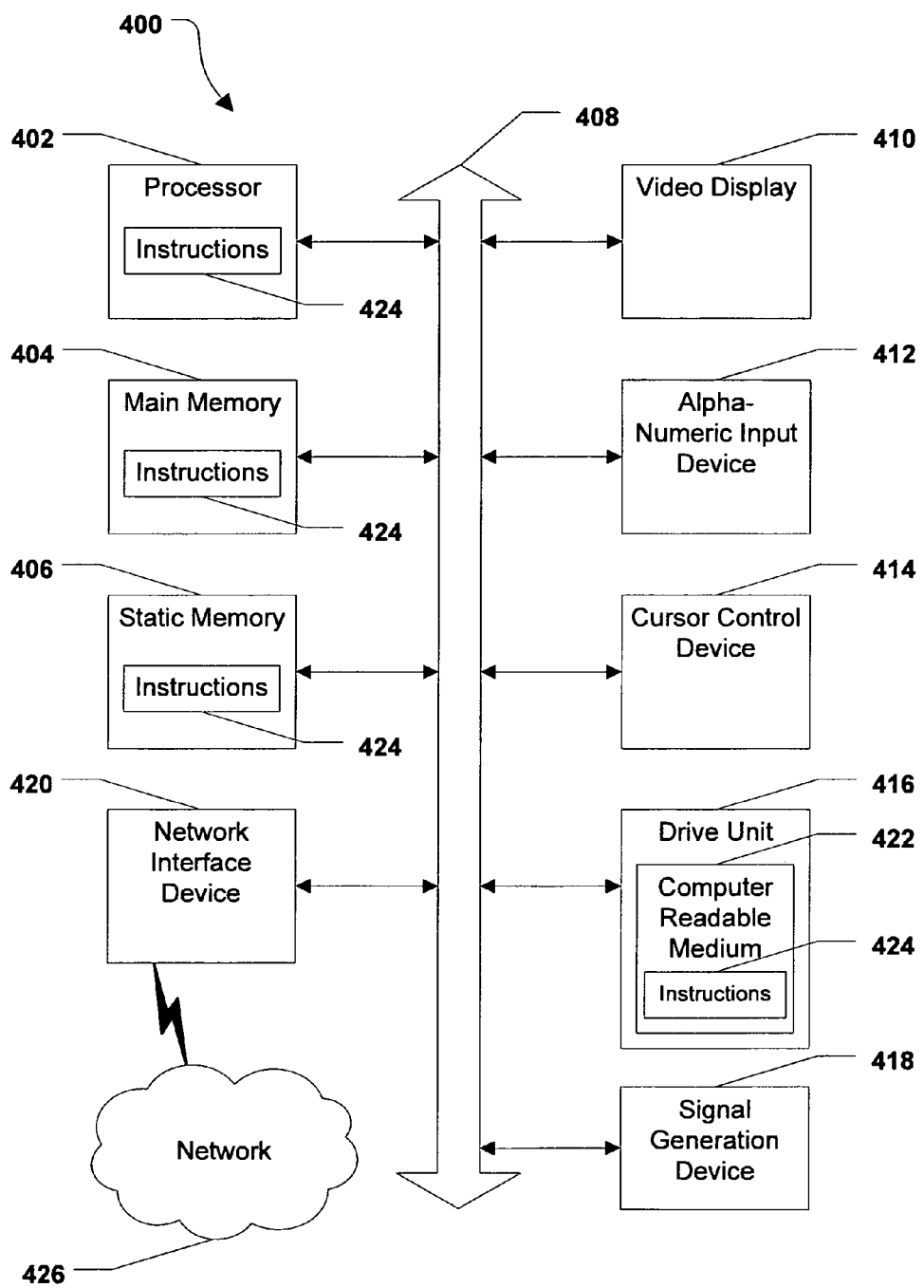
FIG. 4 is block diagram that is representative of a general computer system.

FIG. 3 depicts an alternative method of managing calls to a customer service center. Beginning at block 300, the calls received and handled by a plurality of customer service agents are monitored. At block 302, the sales success of the customer service agents for each good or service offered is determined. Moving to block 304, the customer service agents are ranked in terms of the sales success as determined by the sales success metrics for each good or service offered. Thereafter, at block 306, the customer service agent rankings are recorded. Each call agent can be monitored in order to determine a percentage of total transactions handled the each call agent that results in a sale. Then, each call agent may be ranked based on that percentage. The recorded customer service agent ranking may be used to define a plurality of different customer agent groups based on a particular type of call (e.g., calls with different service offerings).

Proceeding to block 308, when a call is received, the call is routed to an IVR. Next, at block 310, a reason for the call is determined. Continuing to decision step 312, it is determined whether the call is sales related, e.g., is the caller calling to purchase goods or services. If the call is not sales related, the method proceeds to block 314 and there is an attempt to resolve the call via the IVR. Next, at decision step 316, it is determined whether the call is resolved via the IVR. If so, the method ends at state 318. Otherwise, if the call is not resolved via the IVR, the method proceeds to block 320 and the call is routed to the next available customer service agent. Then, the method ends at state 318.

Returning to decision step 312, if the call is sales related, the method continues to block 322 and a good or service of interest is determined. Thereafter, at decision step 324, it is determined whether a top ranked agent for the particular good or service of interest is available. If so, the call is routed to the top agent for that particular good or service and the method then ends at state 318. At decision step 324, if the top ranked agent for the good or service in question is not available, the call is routed to a next highest ranked available agent for the good or service. The method then ends at state 318.

In a particular embodiment, the top ranked agent may be determined based on the recorded customer service ranking. For example, a particular agent may be very adept at selling telephone services, while another agent may be very adept at selling DSL services. As such, the first agent may be ranked high in sales for telephone services and the other agent may be ranked high in sales for DSL services. As such, when request for DSL service is received, the top agent for DSL, if available, will be asked to handle the call. Further, in a particular embodiment, a particular call can be transferred to a queue that serves a group of customer service agents that have a rank above a threshold for a particular service. Thereafter, the call can be answered by the next available agent served by the queue.

Referring to FIG. 6, an illustrative embodiment of a general computer system is shown and is designated 600. In a particular embodiment, one or more of the servers or computers described in conjunction with FIG. I may include one or more of the elements described in conjunction with FIG. 6.

As illustrated in FIG. 6, the computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620. 100421 While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

With the configuration of structure described above, the system and method of managing calls at a customer service center provides a way to route calls to specific customer service agents that are likely to have the required skills to handle the issue associated with a particular customer service call. Further, calls can be routed to specific customer service agents based on the previous success of the customer service agents. For example, if a particular customer service agent is adept at selling a particular service, calls related to sales of such service will be routed to that customer service agent when he or she is available. Otherwise, calls will be routed to the next most successful customer service agent for the particular service.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing calls at a call service center, the method comprising:
    monitoring a plurality of calls received and monitoring service transactions handled by a plurality of customer service agents;
    determining a sales success metric of each of the plurality of customer service agents for each of a plurality of service offerings, wherein the sales success metric is determined based on a percentage of service transactions resulting in a sale;
    ranking the customer service agents in terms of the sales success metric for each of the plurality of service offerings;
    recording the customer service agent rankings for each of the service offerings;
    receiving a telephone call;
    determining whether the telephone call is related to a particular service offering of the plurality of service offerings;
    determining one or more customer service agents that are available using a vacation planning and tracking application; and
    transferring the telephone call to a top ranked customer service agent associated with the particular service offering when the top ranked customer service agent is available.

2. The method of claim 1, further comprising transferring the telephone call to a next highest ranked customer service agent associated with the particular service offering when the top ranked customer service agent is not available.

3. A method of managing telephone calls at a customer call center, the method comprising:

receiving a telephone call;

determining whether the telephone call is a repeat telephone call related to a prior call;

determining a reason for the telephone call;

determining whether the reason for the telephone call is associated with a particular service offering of a plurality of service offerings;

determining one or more call agents that are available and currently assigned to work using a vacation planning and tracking application;

determining whether the one or more call agents that are available and currently assigned to work are idle at the time of the telephone call; and routing the telephone call to a call agent that is available and idle and that has the highest rank associated with the particular service offering when the telephone call is a repeat telephone call.

4. The method of claim 3, further comprising determining whether the telephone call is resolved via an integrated voice response server when the telephone call is not a repeat telephone call.

5. The method of claim 4, further comprising determining an estimated wait time when the telephone call is not resolved via the integrated voice response server.

6. The method of claim 5, further comprising determining whether the estimated wait time is less than a threshold.

7. The method of claim 6, further comprising transferring the call to a primary call agent when the estimated wait time is less than the threshold.

8. The method of claim 7, further comprising determining a number of idle secondary agents when the estimated wait time is not less than the threshold.

9. The method of claim 8, further comprising determining whether the number of idle secondary agents is greater than a threshold.

10. The method of claim 9, further comprising transferring the call to a secondary call agent when the number of idle secondary agents is greater than the threshold.

11. The method of claim 9, further comprising transferring the call to a next available call agent when the number of idle secondary agents is not greater than the threshold.

12. The method of claim 10, wherein the primary call agent has skills to handle more call issues than the secondary call agent.

13. A system for managing calls at a customer call center, the system comprising:
   a call server;
   a processor within the call server;
   a memory accessible to the processor;
   a computer program embedded within the memory, the computer program comprising:
      instructions to determine whether the telephone call is a repeat telephone call related to a prior call;
      instructions to determine a reason for the telephone call;
      instructions to determine whether the reason for the telephone call is associated with a particular service offering;
      instructions to determine one or more customer service agents that are available using a vacation planning and tracking application;
      instructions to determine, from the one or more customer service agents that are available, a top ranked customer service agent for the particular service offering in terms of a sales success metric, wherein the sales success metric is determined based on a percentage of service transactions resulting in a sale; and
      instructions to route the telephone call to the top ranked customer service agent when the telephone call is a repeat telephone call.

14. The system of claim 13, wherein the computer program further comprises instructions to determine whether the telephone call is resolved via an integrated voice response server when the telephone call is not a repeat telephone call.

15. The system of claim 14, wherein the computer program further comprises instructions to determine an estimated wait time.

16. The system of claim 13, further comprising a plurality of customer service agent computers associated with a plurality of customer service agents.

17. The system of claim 16, wherein the plurality of customer service agents are divided into a plurality of skills groups.

18. The system of claim 17, wherein the plurality of customer service agent computers includes a set of primary customer service agent computers associated with a set of primary customer service agents having a first set of skills and a set of secondary customer service agent computers associated with a set of secondary customer service agents having a second set of skills.

19. The system of claim 18, wherein the first set of skills is greater than the second set of skills.

20. A call agent server comprising:
   a processor;
   a memory accessible to the processor; and
   a computer program embedded within the memory, the computer program comprising:
      instructions to monitor a plurality of calls received by a plurality of customer service agents;
      instructions to rank the plurality of customer service agents in terms of sales success for each service offering of a plurality of service offerings, wherein sales success is determined based on a percentage of service transactions resulting in a sale;
      instructions to determine whether a received telephone call is related to a particular service offering of the plurality of service offerings;
      instructions to determine one or more of the plurality of customer service agents that are available using a vacation planning and tracking application; and
      instructions to transfer the telephone call to a top ranked customer service agent associated with the particular service offering when the top ranked customer service agent is available.

21. The server of claim 20, wherein the computer program further comprises instructions to transfer the telephone call to a next highest ranked customer service agent associated with the particular service offering when the top ranked customer service agent is not available.

22. The system of claim 20, wherein the computer program further comprises instructions to transfer the telephone call to one of a group of customer service agents having a sales rank above a threshold for the particular service offering.

* * * * *